(12) United States Patent
Sakai

(10) Patent No.: US 8,441,605 B2
(45) Date of Patent: May 14, 2013

(54) POLARIZING PLATE, DISPLAY, AND ELECTRONIC APPARATUS

(75) Inventor: Eiji Sakai, Kanagawa (JP)

(73) Assignee: Japan Display West Inc., Aichi (JP)

( * ) Notice: Subject to any disclaimer, the term of this patent is extended or adjusted under 35 U.S.C. 154(b) by 0 days.

(21) Appl. No.: 13/475,124

(22) Filed: May 18, 2012

(65) Prior Publication Data

US 2012/0229021 A1 Sep. 13, 2012

Related U.S. Application Data

(62) Division of application No. 12/481,994, filed on Jun. 10, 2009, now Pat. No. 8,203,677.

(30) Foreign Application Priority Data

Jun. 11, 2008 (JP) ................................. 2008-153082

(51) Int. Cl.
*G01F 1/141* (2006.01)

(52) U.S. Cl.
USPC ........... 349/135; 349/123; 349/127; 349/128; 349/129; 349/193; 257/E51.022; 257/E31.096

(58) Field of Classification Search ................ 349/123, 349/127, 128, 129, 135, 19; 257/E51.022, 257/98, E31.096
See application file for complete search history.

(56) References Cited

U.S. PATENT DOCUMENTS

| 7,135,712 | B2 * | 11/2006 | Broer et al. | 257/98 |
| 7,326,449 | B2 * | 2/2008 | Geisow et al. | 428/1.2 |
| 2006/0007371 | A1 * | 1/2006 | Miyatake et al. | 349/96 |
| 2008/0055521 | A1 * | 3/2008 | Mizutani et al. | 349/96 |
| 2008/0143894 | A1 * | 6/2008 | Oohira et al. | 349/12 |
| 2008/0170192 | A1 * | 7/2008 | Jeng | 349/128 |
| 2010/0207115 | A1 * | 8/2010 | Iou | 257/40 |

FOREIGN PATENT DOCUMENTS

| JP | 06-258634 | 9/1994 |
| JP | HEI 10-010523 A | 1/1998 |
| JP | 2004-170875 | 6/2004 |
| JP | 2005-352068 A | 12/2005 |
| JP | 2008-083307 A | 4/2008 |
| WO | 2008-047785 A1 | 4/2008 |

OTHER PUBLICATIONS

Japanese Office Action dated Jun. 14, 2010 for JP Application No. 2008-153082.

* cited by examiner

*Primary Examiner* — Edward Glick
*Assistant Examiner* — Sang V Nguyen
(74) *Attorney, Agent, or Firm* — Dentons US LLP

(57) ABSTRACT

The present invention provides a polarizing plate including: a layer of polarizer for polarizing incident light and emitting the polarized light; and a coating type optically anisotropic layer disposed on the side to which the polarized light is emitted from the polarizer layer.

4 Claims, 5 Drawing Sheets

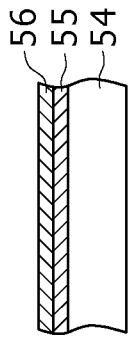
FIG. 5B1 (FIRST EMBODIMENT)
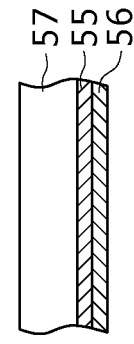
FIG. 5B2 (SECOND EMBODIMENT)
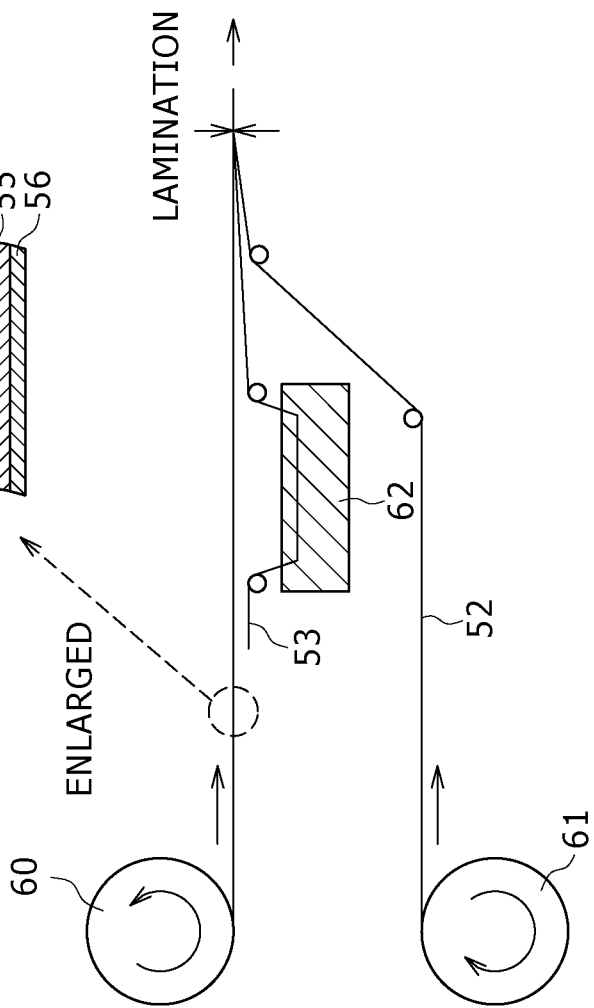
FIG. 5A

POLARIZING PLATE, DISPLAY, AND ELECTRONIC APPARATUS

CROSS REFERENCES TO RELATED APPLICATIONS

This application is a divisional of U.S. patent application Ser. No. 12/481,994, filed Jun. 10, 2009, the entirety of which is incorporated herein by reference to the extent permitted by law. The present application claims priority to Japanese Patent Application No. JP 2008-153082 filed in the Japan Patent Office on Jun. 11, 2008, the entirety of which also is incorporated by reference herein to the extent permitted by law.

BACKGROUND OF THE INVENTION

1. Field of the Invention

The present invention relates to a polarizing plate including a polarizer for linearly polarizing incident light and emitting the linearly polarized light, a display having the polarizing plate, and an electronic apparatus having the display.

2. Description of the Related Art

In liquid crystal displays and organic electroluminescence (EL) displays, transmitted light is optically modulated according to a picture signal inputted, or pixels are put into self-luminescence at luminances according to a picture signal, to thereby obtain a gradation on a pixel basis. A layer by which the transmitted light or the luminance of luminescence is modulated on a pixel basis will hereinafter be referred to as "modulating functional layer." In the liquid crystal displays, the liquid crystal layer corresponds to the modulating functional layer, and in the organic EL displays, the organic EL layer corresponds to the modulating functional layer.

The light emitted from the modulating functional layer to the display surface (front surface) side undergoes two-dimensional optical modulation such that the brightness differs on a pixel basis, and, therefore, the light thus emitted serves as image display light with which a desired image is displayed.

The liquid crystal layer is not a light valve which perfectly shields light by itself. Therefore, it is usually necessary to dispose a (linearly) polarizing plate on each side in the thickness direction of the liquid crystal layer, i.e., on each of the backlight side and the display surface side of the liquid crystal layer, thereby raising the contrast to a level fit for practical use.

On the other hand, the organic EL layer is not luminous when no voltage is impressed thereon. Therefore, the organic EL display is capable of perfect black display, so that it is high in contrast. In this case, accordingly, a polarizing plate is not provided on the display surface side for the purpose of shielding the luminescence at the time of black display.

However, particularly in the case of an organic EL display for outdoor use, a phenomenon is liable to occur in which the reflection of ambient light by the internal metal wirings causes a lowering in contrast. Since the light reflected by the internal metal members is independent on the screen display and is generated even at the time of black display, it causes a lowering in contrast. In order to prevent a lowering in contrast from occurring due to such internal reflection, some organic EL displays have, for example, a combination of a (circularly) polarizing plate and a λ/4 plate on the display surface side. When the (circularly) polarizing plate and the λ/4 plate are combined, it is possible to secure a 90° directional change of linearly polarized light between the incident ambient light and the reflected light (the light which might go out on the same side as the incidence side after being reflected internally), so that the actual outgoing of the reflected light can be obviated.

In either of the two kinds of displays, a polarizing plate having a linearly polarizing function is disposed on the display surface side.

Such a display or an electronic apparatus having such a display may sometimes be used by a user wearing a pair of polarizing sunglasses. The pair of polarizing sunglasses is used for the purpose of shielding the polarized light components often outputted upon reflection of the sunlight on a variety of substances, thereby protecting eyes from the strong stimuli of the polarized light components, for example. Therefore, a pair of polarizing sunglasses is a kind of polarizing plate which has a transmission axis in a certain direction and an absorption axis in a direction orthogonal to the transmission axis.

When a display is viewed by a person wearing a pair of polarizing sunglasses, the presence of the polarizing plate on the display surface side may greatly lower the visibility of the display screen, depending on the angle of viewing.

Particularly in the case of a liquid crystal display, the arrangement angle of the polarizing plate on the display surface side has an extremely intimate relation with the display performance (luminance, contrast, viewing angle, etc.). Specifically, when the absorption axis in the polarizing plate on the display surface side has a rotational error in relation to the absorption axis in the liquid crystal layer underneath or in other polarizing plate, the display performance itself is likely to be lowered. Accordingly, it is difficult to enhance the visibility of the screen as viewed through a pair of polarizing sunglasses, without influencing the display performance at all.

Meanwhile, the number of functions of mobile apparatuses having a display has been increasing more and more, and the mobile apparatuses which are not only used for simply displaying character data but also frequently used as video image reproduction apparatuses for displaying television broadcasts, movies, etc. have appeared.

In such a mobile apparatus, characters being displayed are easier to look at when the screen is vertically oriented (portrait position), but the screen is desirably put into a wide-screen position (landscape position) at the time of reproducing a video image. Therefore, such a mobile apparatus may be used with the screen turned into the portrait position or the landscape position according to the user's choice. Not only mobile apparatuses but also other apparatuses, for example, on-vehicle apparatuses are designed to be capable of such a switching of the screen into the portrait position and the landscape.

Since these apparatuses are used outdoors or at the automotive driver seat, their display screens have to retain a certain level of visibility as viewed from an arbitrary angle by a user wearing a pair of polarizing sunglasses. Accordingly, there is a need for a polarizing plate which ensures that the visibility differs little with variation in the angle of viewing.

In view of this, there has been known a technology in which a linear retarder having a very great retardation is adhered to the outermost surface of a polarizing plate on the display surface side, at a predetermined angle relative to the polarizing plate in the range of 30° to 60° (refer to, for example, Japanese Patent Laid-open Nos. 2004-170875 (hereinafter referred to as Patent Documents 1) and Hei 06-258634 (hereinafter referred to as Patent Document 2)).

SUMMARY OF THE INVENTION

According to the descriptions in these documents, the retardation is not less than 2400 nm in Patent Document 1, and not less than 4000 nm in Patent Document 2. Therefore, the retardation plate is very thick, and it is difficult to make thinner the polarizing plate as a whole. From such a thickness, it is expected that the retardation plate provided by use of this technology is of the type that is formed on a base film and adhered to a surface of the polarizing plate.

In addition, it is also possible to set the linear retarder at the outermost surface in a λ/4 wavelength condition, thereby making the linear retarder thinner.

In this case, however, the colors displayed in the case where the screen is in the portrait position and the colors displayed where the screen is in the landscape position differ from each other, so that visibility is thereby lowered.

Thus, there is a need for a polarizing plate with which the visibility of a display screen is not lowered depending on the angle of viewing when the screen is viewed through a pair of polarizing sunglasses and which is thin.

Also, there is a need for a display which has the thin, high-visibility polarizing plate on the display surface side, and for an electronic apparatus having the polarizing plate.

According to a first viewpoint of the present invention, there is provided a polarizing plate including: a layer of polarizer for polarizing incident light and emitting the polarized light; and a coating type optically anisotropic layer disposed on the side to which the polarized light is emitted from the polarizer layer.

In the viewpoint of the present invention, preferably, the polarizing plate further includes a molecule fixing layer which is a film in contact with the optically anisotropic layer and by which orientations of molecules constituting the optically anisotropic layer are fixed in a random state or in an intermediate state between the random state and an aligned state.

In this case, preferably, the polarizing plate includes: a first base layer; the polarizer layer disposed over the first base layer; a second base layer disposed over the polarizer layer; the molecule fixing layer disposed over the second base layer; the optically anisotropic layer disposed over the molecule fixing layer; and a protective layer disposed over the optically anisotropic layer.

Or, preferably, the polarizing plate includes: a first baser layer; the polarizer layer disposed over the first base layer; the optically anisotropic layer disposed over the polarizer layer; the molecule fixing layer disposed over the optically anisotropic layer; and a second base layer disposed over the molecule fixing layer.

In the viewpoint of the present invention, preferably, retardation represented by the product of the double refractive index of the molecules in the optically anisotropic layer and the thickness of the optically anisotropic layer is in the range of 100 to 200 nm or in a range of an odd number times the range.

According to the above-mentioned configurations, the polarizing plate includes a layer of polarizer and an optically anisotropic layer. Light is incident on the polarizer layer from the side opposite to the side of the optically anisotropic layer. By the polarizing plate, the incident light is converted into (linearly or circularly) polarized light. The light upon the conversion enters the optically anisotropic layer.

The optically anisotropic layer is a layer of which constituent molecules are present as optically anisotropic bodies arranged at various angles. Therefore, when light enters the optically anisotropic layer, the light is divided into different-velocity components by the molecules (optically anisotropic bodies), thus resulting in the so-called birefringence (double refraction). Consequently, the incident light is respectively converted into circularly polarized radiations in a local unit on the basis of each molecule (optically anisotropic body). Thus, the light outputted from the optically anisotropic layer is a set of radiations circularly polarized at various angles.

According to a second viewpoint of the present invention, there is provided a display including: a first substrate and a second substrate between which a liquid crystal is sealed to form a liquid crystal layer; a first polarizing plate disposed on the counter-liquid-crystal-layer side of the first substrate; a second polarizing plate disposed on the counter-liquid-crystal-layer side of the second substrate; and a backlight disposed on the counter-liquid-crystal-layer side of the first polarizing plate; wherein the second polarizing plate includes a layer of polarizer which linearly polarizes incident light coming from the liquid crystal layer side and emits the linearly polarized light to a display surface side, and a coating type optically anisotropic layer disposed on the side to which the light is emitted from the polarizer layer.

According to a third viewpoint of the present invention, a display including: an organic electroluminescence panel by which light generated from an organic electroluminescence element is outputted through a circularly polarizing plate provided at an outgoing surface constituting a principal surface on one side of the panel; wherein the circularly polarizing plate includes a layer of polarizer for circularly polarizing incident light and emitting the circularly polarized light, and a coating type optically anisotropic layer disposed on the side to which the light is emitted from the polarizer layer.

According to a fourth viewpoint of the present invention, there is provided an electronic apparatus including a display incorporating a polarizing plate on an image display surface side, wherein the polarizing plate includes a layer of polarizer for polarizing incident light and emitting the polarized light to the display surface side, and a coating type optically anisotropic layer disposed further on the display surface side relative to the polarizer.

According to embodiments of the present invention, there can be provided a polarizing plate which is thin because of its being of the coating type and which can emit radiations having locally undergone circular polarization at various angles.

According to embodiments of the present invention, by use of the just-mentioned thin polarizing plate, there can be provided a display in which visibility of a display screen is uniform for various angles of viewing, and an electronic apparatus in which the display is mounted.

BRIEF DESCRIPTION OF THE DRAWINGS

FIGS. 5A to 5B2, in relation to a third embodiment of the invention, illustrate a process for manufacturing the second polarizing plate in the first and second embodiments;

DETAILED DESCRIPTION OF THE PREFERRED EMBODIMENTS

Figure 1:
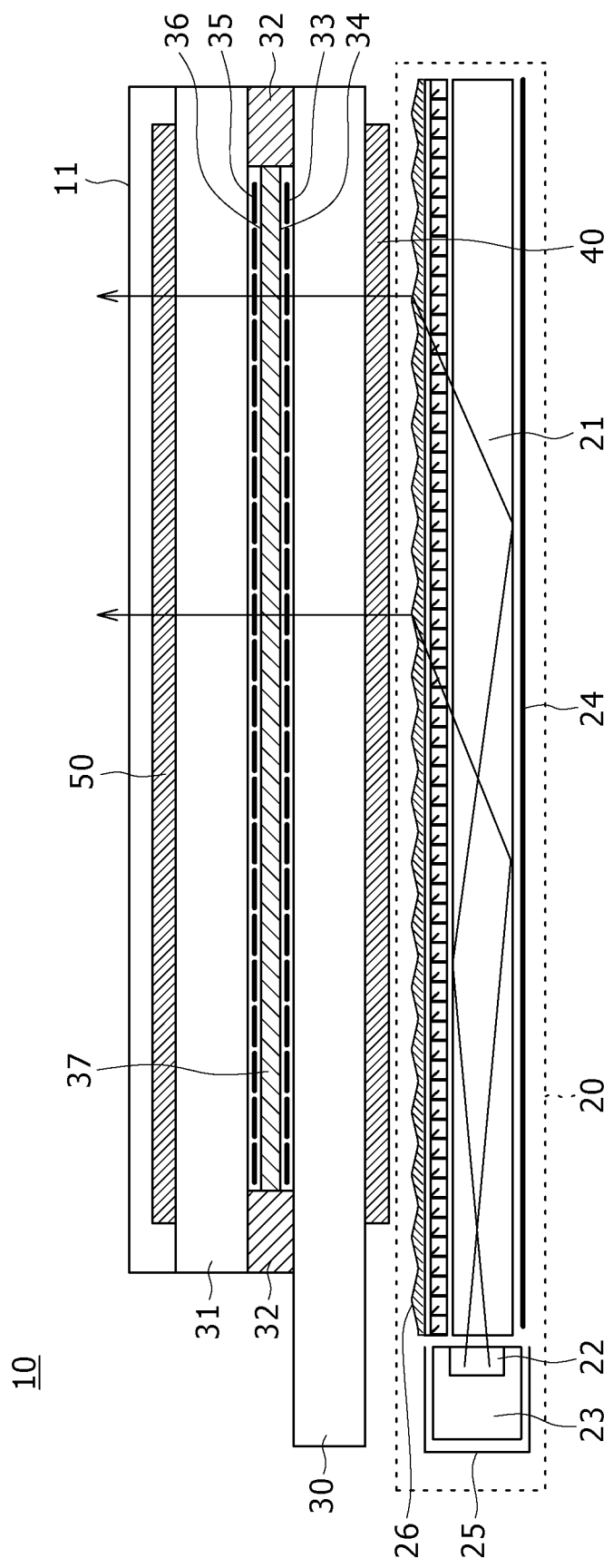
FIG. 1 is a sectional structural view of a liquid crystal display device according to first and second embodiments of the present invention.

Now, embodiments of the present invention will be described below, referring to the drawings.

<<First Embodiment>>
<Display Structure>

First embodiment relates to a liquid crystal display device having a polarizing plate to which the present invention has been applied.

FIG. 1 shows a sectional structural view of the liquid crystal display device. This sectional structure is common to all liquid crystal display devices which may be of the semi-transmission type or of the transmission type. Besides, in the sectional view in FIG. 1, hatchings indicative of sections are partly omitted, for easy viewing of the figure.

The liquid crystal display device 10 illustrated in FIG. 1 has a backlight 20 disposed on the back surface (the surface on the lowermost layer side in the figure) side opposite to the side of a display surface 11 (the surface on the uppermost layer side in the figure).

In the liquid crystal display device 10, a display unit which includes two glass substrates adhered to each other and has various functional layers between the glass substrates and on the outer sides of the glass substrates is disposed between the backlight 20 and the display surface 11.

The backlight 20 is an illuminator for exclusive use for image display, wherein a light guide plate 21, a light source 22 such as light emitting diodes, a light source driving section 23, a reflective sheet 24, a reflective plate 25, a prism sheet 26 and the like are integrally assembled.

The display unit has a driver substrate 30 on the backlight 20 side and a counter substrate 31 on the display surface 11 side, as the two glass substrates.

The driver substrate 30 has a circuit forming layer 33 in which circuit elements and electrodes in each of pixels including TFT transistors are formed, and a first alignment film 34 formed over the circuit forming layer 33.

A color filter layer 35 and a second alignment film 36 are formed on one side of the counter substrate 31.

The driver substrate 30 is adhered to the counter substrate 31, with spacers 32 interposed therebetween, so as to form an internal space therebetween. In this case, both the substrates are adhered to each other so that the side of the driver substrate 30 on which the circuit forming layer 33 and the first alignment film 34 are formed and the side of the counter substrate 31 on which the color filter layer 35 and the second alignment film 36 are formed face each other.

A liquid crystal has been injected into the internal space between the two substrates through a port in a location (not shown) where the spacer 32 is not formed. Thereafter, the port for injection of the liquid crystal is closed, whereon the liquid crystal is sealed inside the driver substrate 30, the counter substrate 31 and the spacers 32, whereby a liquid crystal layer 37 is formed. Since the liquid crystal layer 37 is in contact with the first alignment film 34 and the second alignment film 36, the orientations of the liquid crystal molecules are determined by the rubbing directions of the alignment films.

Though omitted in FIG. 1 for avoiding complexity, pixel electrodes provided on a pixel basis and a common electrode (not shown) provided in common to the pixels are disposed adjacent to the liquid crystal layer 37 formed as above. The two kinds of electrodes are electrodes for applying voltages to the liquid crystal layer 37. There are a case where the two kinds of electrodes are disposed on the opposite sides of the liquid crystal layer 37 (vertical driving mode) and a case where the two kinds of electrodes are disposed in two layers on the driver substrate 30 side (in-plane driving mode). In the latter case of the two-layer arrangement, both kinds of electrodes are insulated from each other, and the common electrode on the lower layer side applies an electrical action to the liquid crystal through gaps between the patterns of the pixel electrodes which are provided on the upper layer side and in contact with the liquid crystal layer 37. Therefore, in the in-plane driving mode, the direction of the electric fields applied to the liquid crystal is in the in-plane direction. On the other hand, in the case where the two kinds of electrodes are disposed on the opposite sides (in the thickness direction) of the liquid crystal layer 37, the direction of the electric fields is in the vertical direction (thickness direction).

Whichever driving mode may be adopted in arranging the electrodes, voltages can be impressed on the liquid crystal layer 37 by the two kinds of electrodes so as to perform matrix driving. Accordingly, the liquid crystal layer 37 is a functional layer which optically modulates the transmission of light therethrough. The liquid crystal layer 37 displays gradations according to the magnitudes of the voltages applied.

As other optical functional layer, a first polarizing plate 40 is disposed between the backlight 20 and the driver substrate 30. In addition, a second polarizing plate 50 is arranged between the counter substrate 31 and the display surface 11.

The first polarizing plate 40 is adhered to the surface on the counter-liquid-crystal-layer side of the driver substrate 30, and the second polarizing plate 50 is adhered to the surface on the counter-liquid-crystal-layer side of the counter substrate 31. The second polarizing plate 50 is covered by a protective layer, and the outermost surface thereof forms the display surface 11 on which an image is displayed to be viewed externally.

In this embodiment, the polarizing plate 50 on the display surface 11 side has a significant feature.

<Structure of Polarizing Plate>

Figure 2:
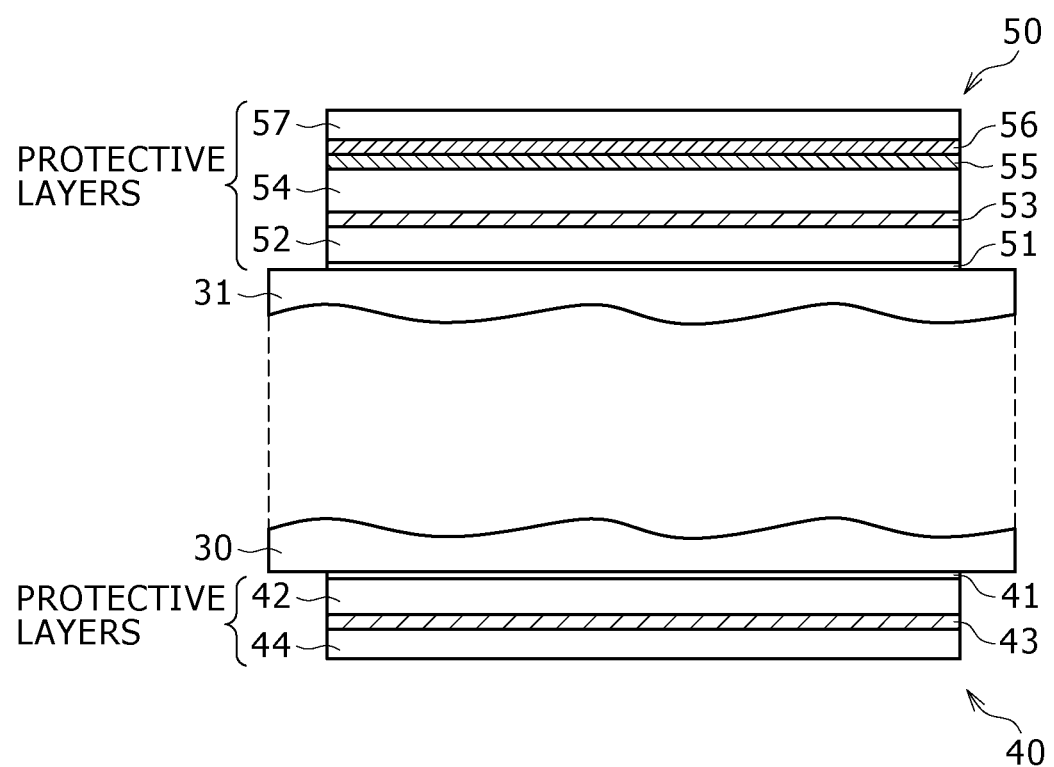
FIG. 2 is a sectional structural view of first and second polarizing plates pertaining to the first embodiment.

FIG. 2 shows sectional structures of the first polarizing plate 40 and the second polarizing plate 50. In FIG. 2, also, hatchings indicative of sections are partly omitted, for easy viewing of the figure.

The first polarizing plate 40 is an ordinary polarizing plate to which the first embodiment of the present invention has not been applied, and it is adhered to the backlight side of the driver substrate 30 by an adhesive layer 41.

The first polarizing plate 40 has a first protective layer 42, a (layer of) polarizer 43, and a second protective layer 44 in this order from the driver substrate 30 side.

The polarizer 43 is formed, for example, from polyvinyl alcohol (PVA) dyed with a dye. The polarizer 43 converts the light coming from the lower side (the backlight side) into linearly polarized light, and outputs the linearly polarized light to the liquid crystal layer 37 (see FIG. 1) in the display unit.

The first and second protective layers 42 and 44 are formed, for example, of triacetyl cellulose (TAC) or the like. The first and second protective layers 42 and 44 sandwich the polarizer 43 therebetween so as to protect the polarizer 43.

The second polarizing plate 50, to which the first embodiment of the present invention has been applied, is adhered to the display surface side of the counter substrate 31 by an adhesive layer 51.

The second polarizing plate 50 has a first protective layer 52, a (layer of) polarizer 53, and a second protective layer 54 in this order from the counter substrate 31 side.

The polarizer 53 is formed, for example, from PVA dyed with a dye. The polarizer 53 converts the light, the quantity of which has been modulated according to a picture signal while passing through the liquid crystal layer 37 (FIG. 1), into linearly polarized light and outputs the linearly polarized light to the display surface 11 (FIG. 1) side. For example, in the liquid crystal displays of TN (Twisted Nematic), VA (Vertical Alignment), and IPS (In Place Switching) modes, the polarizer 53 has an absorption axis which is orthogonal to the absorption axis of the polarizer 43 on the backlight side, in a plane as viewed from the display surface 11. It is to be noted here, however, that the axes of absorption of the polarizer 53 and the polarizer 54 may not be orthogonal to each other in some cases of liquid crystal displays of other modes.

The first and second protective layers 52 and 54 are formed, for example, of triacetyl cellulose (TAC) or the like. The first and second protective layers 52 and 54 sandwich the polarizer 53 therebetween so as to protect the polarizer 53.

The above-described structure, except for the direction of polarization of polarizer, is common to the first polarizing plate 40 and the second polarizing plate 50.

The second polarizing plate 50 is further provided, over the second protective layer 54, with an alignment film 55 as a molecule fixing layer, an optically anisotropic layer 56 disposed over the alignment film 55, and a third protective layer 57 disposed over the optically anisotropic layer 56.

The optically anisotropic layer 56 is formed, for example, from a photopolymerized liquid crystal (LC) polymer, wherein liquid crystal molecules as optically anisotropic bodies are arranged at various angles. The liquid crystal molecules may be in a non-aligned state, in which their orientations are quite at random, or in a slightly aligned state. More specifically, the molecules in the optically anisotropic layer 56 are aligned within the range from the non-aligned state, in which the order parameter is zero, to an aligned state in which the order parameter is about 0.7.

Here, the first alignment film 34 and the second alignment film 36, as alignment films for the liquid crystal layer 37 shown in FIG. 1, are usually oriented to such an extent that the order parameter is saturated at a value of not less than 0.9 at minimum.

The expression that the order parameter of the optically anisotropic layer 56 in this embodiment is not more than about 0.7 at maximum means that the molecules in the optically anisotropic layer 56 are not aligned to such an extent that the order parameter is saturated.

It should be noted here, however, that in a liquid crystal display device which for example is put to use in which the screen is frequently turned to the portrait position and the landscape position, the order parameter is desirably as low as possible; for example, the order parameter is set to a value of not more than 0.5 at maximum. In addition, for use in which the frequency of use of the screen in the portrait position and that in the landscape position are comparable, the optically anisotropic layer 56 is desirably non-aligned.

The alignment film 55 is a film for controlling the order parameter of the optically anisotropic layer 56, and, in this sense, it is called "molecule fixing layer." The control by the molecule fixing layer includes the case where the molecules are fixed in the non-aligned state (random state).

The optically anisotropic layer 56 is of the coating type, and the molecules therein may be aligned to a certain extent in the as-applied state (the state upon coating). However, where the alignment film 55 is a film for ensuring non-alignment, the molecules in the optically anisotropic layer 56 may be fixed with their orientations at random. Thus, the expression "alignment film" used herein is not limited to "a film for alignment" but means "a film for controlling the alignment" inclusive of a film for returning the molecules from an aligned state to a non-aligned state.

Incidentally, if the orientation of the molecules obtained upon formation of the optically anisotropic layer 56 by coating is satisfactory, the alignment film 55 may be omitted.

The optically anisotropic layer 56 is of the coating type and, therefore, is very thin. For example, desirably, the retardation of the optically anisotropic layer 56 may be set in the range of 100 to 200 nm, or in a range obtained by multiplying the upper limit and the lower limit of the range by an odd number. Here, a retardation of 100 to 200 nm corresponds to ¼ wavelength of visible light (wavelength: 400-780 nm).

Though depending on the material of the optically anisotropic layer 56 and the like factors, where the retardation is about 150 nm, the actual film thickness is several tens of micrometers.

While details of the material and production method for the coating type optically anisotropic layer 56 will be described in embodiments below, the optically anisotropic layer 56 is formed from a material prepared by dissolving a liquid crystal material in a monomer, or from a material obtained by imparting a photo-curing property to a polymeric liquid crystal material.

Figure 3:
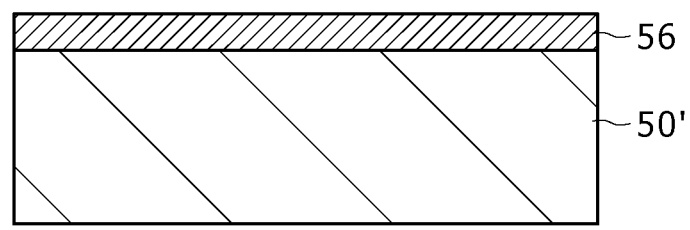
FIG. 3 is a basic structural view of the polarizing plate pertaining to the first and second embodiments.

The optically anisotropic layer 56 can be formed by a production method in which a polarizing plate inclusive of a polarizer or the like is subjected to an aligning treatment, if necessary, and then it is coated with an optically anisotropic material, followed by polymerizing the optically anisotropic material. Therefore, in a simplest structure, as shown in FIG. 3, an optically anisotropic layer 56 is formed on an ordinary polarizing plate 50'.

Incidentally, FIG. 2 shows a structure example suited to the case where the second polarizing plate is formed by a lamination method in which an optically anisotropic layer 56 is formed on a protective layer and is laminated with another protective layer provided thereon with a polarizer.

<<Second Embodiment>>

Figure 4:
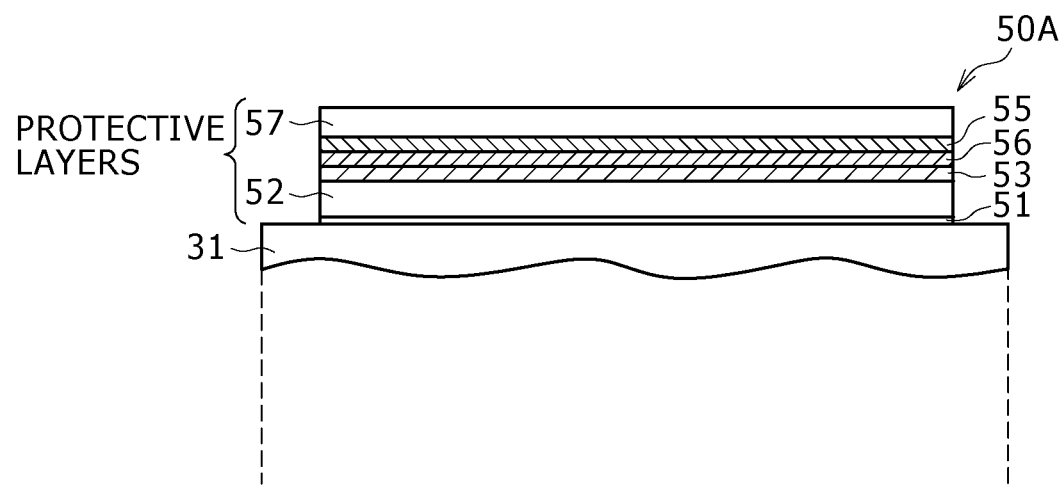
FIG. 4 is a sectional structural view of the second polarizing plate pertaining to the second embodiment.

FIG. 4 shows, in section, a second polarizing plate having a layer arrangement different from that in FIG. 2 of first embodiment.

The second polarizing plate 50A illustrated in FIG. 4 is a polarizing plate which can replace the second polarizing plate 50 of the liquid crystal display device 10 shown in FIG. 1.

The second polarizing plate 50A in FIG. 4 is the same as the second polarizing plate 50 in FIG. 2 in that a first protective layer 52 adhered to a counter substrate 31 by an adhesive layer 51 and a polarizer 53 thereon are disposed in this order.

In the second polarizing plate 50A in this embodiment, an optically anisotropic layer 56, an alignment film 55 and a third protective layer 57 are formed over the polarizer 53. In other words, in the second polarizing plate 50A, the second protective layer 54 in FIG. 2 is omitted, and the positional relationship between the alignment film 55 and the optically anisotropic layer 56 is reverse to that in FIG. 2. These differences have intimate relation with the manufacturing method, which will be described later.

The materials and functions of the alignment film 55 and the optically anisotropic layer 56 are the same as in first embodiment and, therefore, descriptions of them are omitted here.

<<Third Embodiment>>

In this embodiment, a specific production example for obtaining the structure of the second polarizing plate in first or second embodiment above will be shown.

The optically anisotropic layer 56 using a photopolymerized LC polymer is formed on the alignment film 55. The alignment film 55 is an alignment film to which an aligning ability has been imparted by, for example, a rubbing treatment, an optical aligning treatment or the like.

For forming the alignment film 55, use is made of polyimide, polyamide, polyvinyl alcohol or the like. The rubbing treatment is carried out by a method in which a rubbing cloth of a material selected from among such base materials as rayon, cotton, polyamide, and polymethyl methacrylate is wound around a metallic roll, and the roll is rotated with the rubbing cloth in contact with the film (to be rubbed), or the film is fed while the roll is kept stationary, whereby the film surface is rubbed frictionally.

The optically anisotropic layer 56 is a layer in which a polymerizable liquid crystal monomer is crosslinked in three dimensions while being oriented at a fixed angle relative to the substrate surface. In this polymerization type liquid crystal layer, the angle (pretilt angle) formed between the major axis of the polymerizable liquid crystal monomer and the substrate surface of the alignment substrate in the film thickness direction is substantially constant. In addition, the major axes of the polymerizable liquid crystal monomers are alignedly oriented in the aligning direction of the alignment substrate.

As the polymerizable liquid crystal monomer here, materials which are oriented at a fixed angle relative to the surface having been subjected to an aligning treatment may be used; of these materials, preferably, those having high heat resistance are used.

Incidentally, in addition to the polymerizable liquid crystal monomer, the material for forming the optically anisotropic layer 56 may contain a photopolymerization initiator for curing by use of radiations, an alignment assistant for alignment at the air interface or in the vicinity of the alignment film, and a surfactant for enhancing uniformity of film thickness, as required.

The optically anisotropic layer 56 may be a stack of a plurality of layers. In the case of stacking, a polymerization type liquid crystal layer constituting a lower layer may be used as an alignment film for the layer to be formed thereon; besides, an alignment film can be disposed between the layers, thereby changing the axis of luminous intensity distribution. As the polymerization type liquid crystal layer, there can be used those of known nematic, cholesteric, chiral nematic, discotic or smectic regularity and the like. In addition, the homogeneous orientation in which the molecules are oriented in parallel to the alignment film, the hybrid orientation in which the tilt angle varies from the vicinity of the alignment film, and the homeotropic orientation in which the molecules are oriented perpendicular to the alignment film can be used.

Examples of the photopolymerization initiator which can be used include thioxanthone photopolymerization initiators (for example, 2,4-diethylthioxanthone, 2-chlorothioxanthone), benzophenone photopolymerization initiators (for example, benzophenone, (4-(methylphenylthio)phenyl)phenylmethane), and anthraquinone photopolymerization initiators (for example, ethylanthraquinone).

If necessary, a plurality of the photopolymerization initiators may be used in combination, and other photopolymerization initiators may further be added. Besides, the amount of the photopolymerization initiator(s) added is generally 0.01 to 15 wt. %, preferably 0.1 to 12 wt. %, and more preferably 0.3 to 10 wt. %.

Examples of the surfactant which can be used include acrylic surfactants, silicone surfactants, and fluoro surfactants, which may be used either singly or in combination. Examples of the acrylic materials include BYK 361, 307, 325, 344, 352, 354, and 392 (products by BYK-Chemie), and Polyflow 461 (produced by Kyoeisha Chemical Co., Ltd.). Examples of the fluoro materials include SC101, SC386 (produced by AGC), Megaface R-08, R-90, F-430 (produced by Dainippon Ink And Chemicals Inc. (DIC)), and DMAOP (tradename, a product by Azmax Co., Ltd.). Examples of the silicone materials include KF-643, and X22-1927.

The amount of the surfactant(s) added may be set in such a range as not to impair the orientation (alignment) of the liquid crystal. Generally, the amount is preferably about 0.001 to 10 wt. %, more preferably about 0.01 to 5 wt. %, based on the amount of the liquid crystal material.

Such a surfactant is for controlling the tilt angle of the polymerizable liquid crystal monomers in the optical element using the polymerizable liquid crystal composition, whereby it is possible to form an optical element in which the polymerizable liquid crystal monomers are oriented at a tilt angle with a uniform inclination angle in-plane.

Specific examples of such a coupling agent include silane coupling agents obtained by hydrolysis of silane compounds such as n-octyltrimethoxysilane, n-octyltriethoxysilane, decyltrimethoxysilane, decyltriethoxysilane, n-dodecyltrimethoxysilane, n-dodecyltriethoxysilane, octadecyltrimethoxysilane, octadecyltriethoxysilane, etc.

From the viewpoint of achieving homeotropic orientation of the polymerizable liquid crystal monomers even in the case where the thickness of the retardation layer is increased, the coupling agent is preferably one that has a strong action of putting rod-like polymerizable liquid crystal monomers into homeotropic orientation. Specific examples of such a coupling agent include fluorosilane coupling agents (silane coupling agents having a fluoroalkyl group) obtained by hydrolysis of fluorosilane compounds such as perfluoroalkylsilanes, pentafluorophenyltrimethoxysilane, pentafluorophenyltriethoxysilane, pentafluorophenylpropyltrimethoxysilane, pentafluorophenylpropyltriethoxysilane, trifluoropropyltrimethoxysilane, trifluoropropyltriethoxysilane, 1H,1H,2H,2H-perfluorodecyltrimethoxysilane, 1H,1H,2H,2H-perfluorodecyltriethoxysilane, 1H,1H,2H,2H-perfluorooctyltrimethoxysilane, 1H,1H,2H,2H-perfluorooctyltriethoxysilane, 3-(heptafluoroisopropoxy)propyltrimethoxysilane, and 3-(heptafluoroisopropoxy)propyltriethoxysilane.

The amount of the coupling agent(s) to be used differs according to the material of the substrate, the thickness of the retardation layer, the orientation-restricting power of the coupling agent used, etc., and is preferably about 0.001 to 5 wt. %, more preferably about 0.01 to 1 wt. %, based on the total amount of the polymerizable liquid crystal monomer(s). If the coupling agent(s) is contained in a large amount in the polymerizable composition, the homeotropic orientation of the polymerizable liquid crystal is not attained, and phase separation occurs between a region of homeotropic orientation and a region of other orientation than the homeotropic orientation.

<Manufacturing Method>

Now, a method of manufacturing the second polarizing plate 50 will be described below.

FIG. 5A illustrates a lamination step in the manufacturing method.

In the case of the layer arrangement (FIG. 2) in first embodiment, as shown in FIG. 5B1, a film in which the alignment film 55 and the optically anisotropic layer 56 are formed over the second protective layer 54 by coating is wound up in a roll 60.

On the other hand, in the case of the layer arrangement (FIG. 4) in second embodiment, a film is formed by providing the alignment film 55 and the optically anisotropic layer 56 over the third protective film 57 by coating, and is wound up in a roll 60.

Formation of each of these films is carried out as follows.

First, the materials for forming the optically anisotropic layer 56, specifically, the first polymerizable liquid crystal monomer M1, the photopolymerization initiator, and the surfactant are dissolved in a solvent in the above-mentioned predetermined proportions, to prepare a coating liquid.

Next, the alignment film 55 is formed by a predetermined method on a substrate film of TAC or the like which becomes the second protective layer 54 (or the third protective layer 57). Then, for forming the optically anisotropic layer 56, a coating film is formed by applying the coating liquid in a predetermined film thickness. Incidentally, the coating film may be formed by applying one of a variety of coating methods.

Subsequently, the solvent in the coating film to be the optically anisotropic layer 56 is dried, and then an aligning treatment is carried out in a temperature range from a temperature at which a liquid crystal phase is exhibited to a temperature at which an isotropic phase is shown plus about 10° C. Thereafter, irradiation with radiations is carried out at room temperature or with heating, to cause crosslinking of the first polymerizable liquid crystal monomer M1 in three dimensions.

In this case, the irradiation of the coating film with radiations is preferably carried out in an inert gas atmosphere such as nitrogen ($N_2$). By this, a retardation layer excellent in heat resistance can be produced without attack by oxygen.

In addition, as the radiations with which to irradiate the coating film, there can be used radiations from a mercury excited light source such as a low pressure mercury lamp, a high pressure mercury lamp and an extra-high pressure mercury lamp, a xenon light source or the like. Preferably, use is made of a light source operative to emit light having an intensity peak in a wavelength band in which the sensitivity of the photopolymerization initiator is high.

Further, the irradiation of the coating film with radiations is carried out at a temperature which is not lower than room temperature and is not higher than the clear point (N-I point) of the liquid crystal monomer. By this, a retardation layer having a high crosslink density and excellent heat resistance can be produced, without spoiling liquid crystal property (anisotropy). Incidentally, the clear point is the temperature of phase transition between a liquid crystal phase and an isotropic phase.

In the formation of the optically anisotropic layer 56 as above, the thickness of the layer is controlled. The controlling method which can be used differs depending on the coating system. For example, in the case of spin coating system, the film thickness can be controlled by regulating the concentration of solid matter in the coating liquid, the rotating speed in the spin coating, the rotation time, or the like. In the cases of extrusion coating systems such as slit coating and die coating, the film thickness is controlled by regulating the concentration of solid matter in the coating liquid, the relative velocity between the slit head or die head and the substrate to be coated, the amount of coating or the like.

After the layer in which the polymerizable liquid crystal monomer(s) is crosslinked in three dimensions is thus formed, a heat treatment is conducted to further advance the three-dimensional crosslinking. Here, the heat treatment is carried out at a temperature of not lower than the clear point (N-I point) of the liquid crystal monomer, whereby it is possible to obtain an inclined and aligned retardation layer which is further excellent in heat resistance.

Conditions for the heat resistance may differ depending on the materials used, and heat treatment conditions in the steps subsequent to the retardation layer forming step. Here, the heat treatment is carried out at 100 to 230° C. for 10 to 120 min. This makes it possible to obtain a retardation layer which is protected against such deteriorations as yellowing, lowering in phase difference quantity (retardation), etc. which might otherwise be caused by heat treatments in the subsequent steps.

Consequently, even in the case where the optically anisotropic layer 56 is exposed to heat treatment(s) in the subsequent steps, the characteristics of the retardation layer can stably be kept unchanged across the heat treatment(s). For instance, the front-side phase difference and the phase difference from the direction inclined to a polar angle direction can stably be kept unchanged across the heat treatment(s).

In the step illustrated in FIG. 5, the material of the roll 60 of the film thus formed, the material of the roll 61 in which the first protective layer 52 is wound up, and the polarizer 53 to be inserted therebetween are adhered to one another in a lamination step. A PVA film to be the polarizer 53 is supplied to the lamination step after being dyed in a dye-containing liquid tank 62 and dried.

After the lamination, the second polarizing plate 50 thus formed is cut to a predetermined size, before being adhered to the counter substrate 31 by the adhesive layer 51.

<<Fourth Embodiment>>

Fourth embodiment relates to an organic EL display device to which the present invention has been applied.

Figure 6:
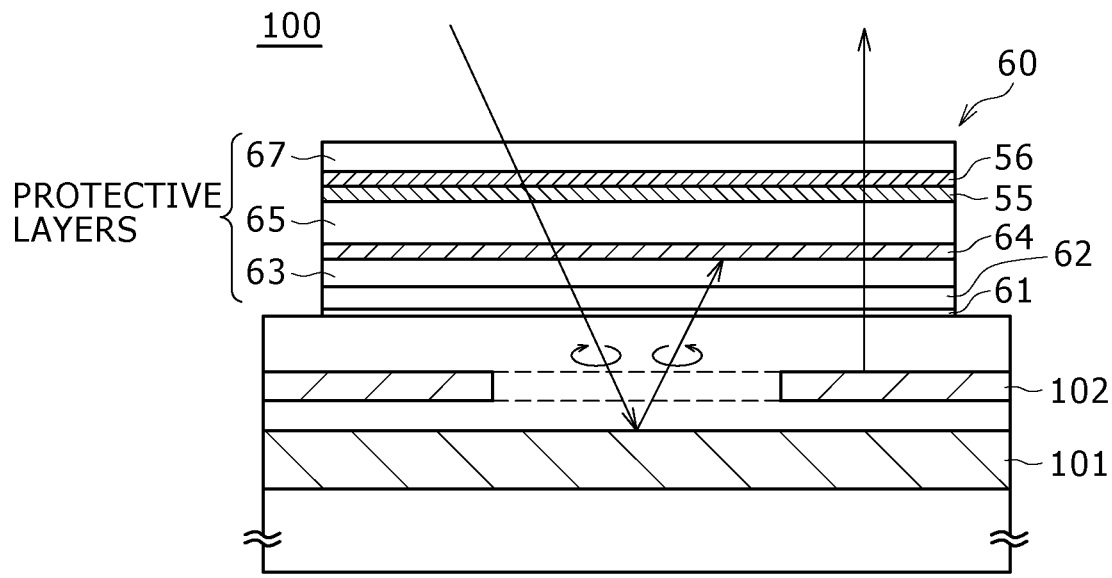
FIG. 6 is a schematic sectional structural view of an organic EL display device pertaining to a fourth embodiment of the invention.

FIG. 6 shows schematically the device structure. In this sectional view, hatchings indicative of sections are partly omitted, for easy viewing of the figure, and a polarizing plate on the display surface side is shown in the state of being enlarged particularly in the thickness direction.

The organic EL display device has a pixel circuit which includes pluralities of TFTs and capacitors and is formed in a structure stacked on a substrate. The pixel circuit is omitted in the organic EL display device 100 shown in FIG. 6. A metal layer 101 composed of aluminum or the like is formed at an upper layer over the pixel circuit. The metal layer 101 is used, for example, as wiring for matrix driving of pixels.

Further over the metal layer 101, there is formed an organic diode laminate film 102 which includes cathodes of organic light emitting diodes connected to other metal layer and TFTs at predetermined positions, a luminous layer having a plurality of organic films formed thereover, and anodes formed thereover by use of a transparent conductive material. In this structure, light emitted from the organic diode laminate film 102 is so guided as to be outputted to the transparent electrode side.

On the other hand, at an uppermost layer of the display unit panel formed in this manner, a polarizing plate 60 for prevention of reflection is formed.

The polarizing plate 60 is a polarizing plate to which this embodiment of the present invention has been applied. Specifically, the polarizing plate 60 is adhered to the display surface side of the display unit by an adhesive layer 61.

The polarizing plate 60 has a quarter-wave plate 62, a first protective layer 63, a (layer of) polarizer 64, and a second protective layer 65 in this order from the lower side.

The structure of the polarizing plate 60 up to this point is equivalent to that of an ordinary anti-reflection polarizing plate. The polarizing plate 60 is provided further with an alignment film (molecule fixing layer) 55 and an optically anisotropic layer 56 stacked thereon, and the assembly is further covered by a third protective layer 67.

The alignment film 55 and the optically anisotropic layer 56 have the same functions as those in first to third embodiments, and are formed from the same materials as those in first to third embodiments.

The manufacturing method in third embodiment can be applied to fourth embodiment in substantially the same manner, except for the part where the quarter-wave plate 62 is formed.

The first to third protective layers 63, 65, 67 are formed, for example, from triacetyl cellulose (TAC).

When ambient light is incident on the display surface side, the incident light is converted by the polarizer 64 into linearly polarized light, which is then converted by the quarter-wave plate 62 into circularly polarized light. The circularly polarized light is reflected, for example, by the metal layer 101 in the display unit, to be returned to the display surface side. By the reflection in this instance, for example, right-handed circularly polarized light is converted into left-handed circularly polarized light. Therefore, when the reflected light again passes through the quarter-wave plate 62, it returns from the circularly polarized light to the linearly polarized light. Since the direction of polarization becomes different by 90 degrees, however, the reflected light is absorbed in the vicinity of the polarizer 64, to be converted into heat. As a result, reflection is prevented.

In first to fourth embodiments described above, when the optically anisotropic layer 56 is provided, the polarizing plates can be made to be comparatively thinner, so that they can be integrally incorporated in a thin-type display.

Figure 7:
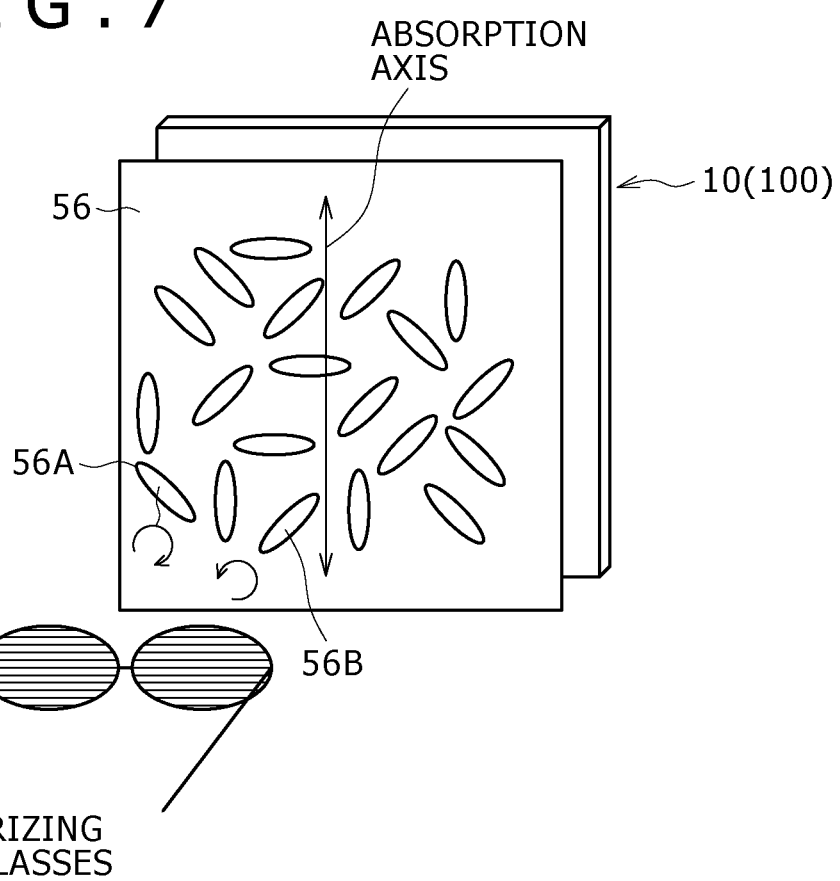
FIG. 7 illustrates operation and effect of an optically anisotropic layer in the first to fourth embodiments.

In addition, even in the case where the absorption axis of the linear polarizer and the absorption axis of a pair of polarizing sunglasses are orthogonal to each other as schematically illustrated in FIG. 7, the image being displayed can be easily viewed through the polarizing sunglasses due to local circular polarization, since the molecules in the optically anisotropic layer 56 are present in various orientations. For example, between the liquid crystal molecules 56A and 56B which differ in molecular orientation by about 90 degrees, there exists a 90-degree difference in the direction of circular polarization. In addition, there also exist liquid crystal molecules which are inclined at intermediate angles. On the whole, the image can be favorably displayed as viewed from any angle.

While FIG. 7 illustrates an example of non-alignment, the liquid crystal molecules may be aligned to a certain extent, according to the ordinary angles of viewing. Control of the alignment is performed by the alignment film 55.

Besides, in this embodiment, unlike in the case where a quarter-wave plate is disposed at the outermost display surface, slight coloring over the whole screen area does not occur. Specifically, when attention is paid to individual liquid crystal molecules shown in FIG. 7, the rays transmitted through the molecules appear with slight bluing or slight yellowing according to the inclinations of the individual molecules. As a whole, however, such colorings are averaged, and, therefore, color reproducibility of the image being displayed is not spoiled.

Thus, in the embodiments of the present invention, in the polarizer and the display using the same, the module can be made thinner while preventing the visibility from being lowered, even in the case where the displayed image is viewed through a pair of polarizing sunglasses or any other cases.

Incidentally, the display devices pertaining to first to fourth embodiments described above are widely applicable as display units of portable electronic apparatuses such as mobile phones, portable game machines, etc., on-vehicle electronic apparatuses having a car navigation function, and other electronic apparatuses.

The above descriptions constitute embodiments of these electronic apparatuses.

The present application contains subject matter related to that disclosed in Japanese Priority Patent Application JP 2008-153082, filed in the Japan Patent Office on Jun. 11, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display comprising:
   an organic electroluminescence panel including a plurality of organic electroluminescence elements that generate light; and
   a circularly polarizing plate on a display surface side of the panel through which the light is output, the circularly polarizing plate comprising
   a polarizer layer that circularly polarizes incident light and emits the circularly polarized light from one side thereof,
   an optically anisotropic layer on the side to which the circularly polarized light is emitted from the polarizer layer, and
   a molecule fixing layer which is a film in contact with the optically anisotropic layer and that controls an order parameter of the optically anisotropic layer so that orientations of molecules constituting the optically anisotropic layer are fixed in a random state or in an intermediate state between the random state and an aligned state.

2. The display according to claim 1, wherein the circularly polarizing plate comprises:
   a first base layer;
   the polarizer layer disposed over the first base layer;
   a second base layer disposed over the polarizer layer;
   the molecule fixing layer disposed over the second base layer;
   the optically anisotropic layer disposed over the molecule fixing layer; and
   a protective layer disposed over the optically anisotropic layer.

3. The display to according claim 1, wherein the circularly polarizing plate comprises:
   a first baser layer;
   the polarizer layer disposed over the first base layer;
   the optically anisotropic layer disposed over the polarizer layer;
   the molecule fixing layer disposed over the optically anisotropic layer; and
   a second base layer disposed over the molecule fixing layer.

4. The display according to claim 1, wherein retardation represented by the product of the double refractive index of the molecules in the optically anisotropic layer and the thickness of the optically anisotropic layer is in the range of 100 to 200 nm or in a range of an odd number times the range.

* * * * *